(12) United States Patent
Tsai

(10) Patent No.: US 7,500,119 B2
(45) Date of Patent: Mar. 3, 2009

(54) POWER SAVING TECHNIQUES FOR USE IN COMMUNICATION SYSTEMS, NETWORKS, AND DEVICES

(75) Inventor: Jr-Shian Tsai, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 513 days.

(21) Appl. No.: 11/314,221

(22) Filed: Dec. 21, 2005

(65) Prior Publication Data

US 2007/0143637 A1 Jun. 21, 2007

(51) Int. Cl.
*G06F 1/26* (2006.01)
(52) U.S. Cl. .................................. 713/300; 713/320
(58) Field of Classification Search .................. 713/300; 455/572
See application file for complete search history.

(56) References Cited

U.S. PATENT DOCUMENTS

| | | | |
|---|---|---|---|
| 6,917,598 B1 * | 7/2005 | Emeott et al. ............... | 370/311 |
| 6,973,052 B2 * | 12/2005 | Wang et al. .................. | 370/278 |
| 7,324,468 B2 * | 1/2008 | Fischer ........................ | 370/311 |
| 7,328,026 B2 * | 2/2008 | Gu et al. ...................... | 455/452.1 |
| 2002/0082060 A1 * | 6/2002 | Kang et al. .................. | 455/574 |
| 2004/0141490 A1 * | 7/2004 | Hong .......................... | 370/345 |
| 2005/0041618 A1 * | 2/2005 | Wei et al. .................... | 370/328 |
| 2005/0081254 A1 * | 4/2005 | Carlson et al. .............. | 725/140 |
| 2005/0085279 A1 * | 4/2005 | Aoki ........................... | 455/574 |
| 2005/0213534 A1 * | 9/2005 | Benveniste .................. | 370/328 |
| 2005/0288022 A1 * | 12/2005 | Ryu et al. .................... | 455/439 |
| 2006/0056377 A1 * | 3/2006 | Wu et al. ..................... | 370/345 |
| 2007/0004374 A1 * | 1/2007 | Kneckt ....................... | 455/343.1 |

OTHER PUBLICATIONS

"WMM Power Save for Mobile and Portable Wi-Fi Certified Devices", *Wi-Fi Alliance*, (Dec. 2005), 16 pages.

* cited by examiner

*Primary Examiner*—Nitin C Patel
(74) *Attorney, Agent, or Firm*—The Law Office of John C. Scott, LLC; John C. Scott

(57) ABSTRACT

Power saving strategies are presented for use in communication systems, networks, and devices. In at least one embodiment, a power saving probe request is sent from a first entity to a second entity to request information on available power saving capabilities of the second entity. The first entity may then receive a power saving probe response from the second entity that includes information on available power saving capabilities of the second entity. The first entity may then negotiate with the second entity for provision of at least one power saving service chosen from the available power saving capabilities. In another embodiment, a first entity may send power saving probe requests to a number of second entities to request information on available power saving capabilities of the second entities. The first entity may then receive power saving probe responses from the second entities that each include information on available power saving capabilities of a corresponding second entity. The first entity may then select a second entity with which to communicate based on information within the received power saving probe responses.

23 Claims, 7 Drawing Sheets

POWER SAVING TECHNIQUES FOR USE IN COMMUNICATION SYSTEMS, NETWORKS, AND DEVICES

TECHNICAL FIELD

The invention relates generally to electronic communications and, more particularly, to power saving techniques for use in communication systems, networks, and devices.

BACKGROUND OF THE INVENTION

Most modern communication protocols and standards, both wired and wireless, place a premium on communication performance and are less concerned with power management issues within a corresponding system or network. For example, some standards define link negotiation procedures that always select a fastest link available with little or no consideration given to the higher power consumption associated with the faster link. In many cases, power management is not even addressed within a protocol or standard and, when it is, it is often limited in scope and complexity. For example, some systems simply provide power management that is either on or off with little or no advance handshaking before a device goes into a power save mode. There is a need for processes, protocols, and structures that provide a higher level of power management functionality within communication systems, networks, and devices.

DETAILED DESCRIPTION

Figure 1:
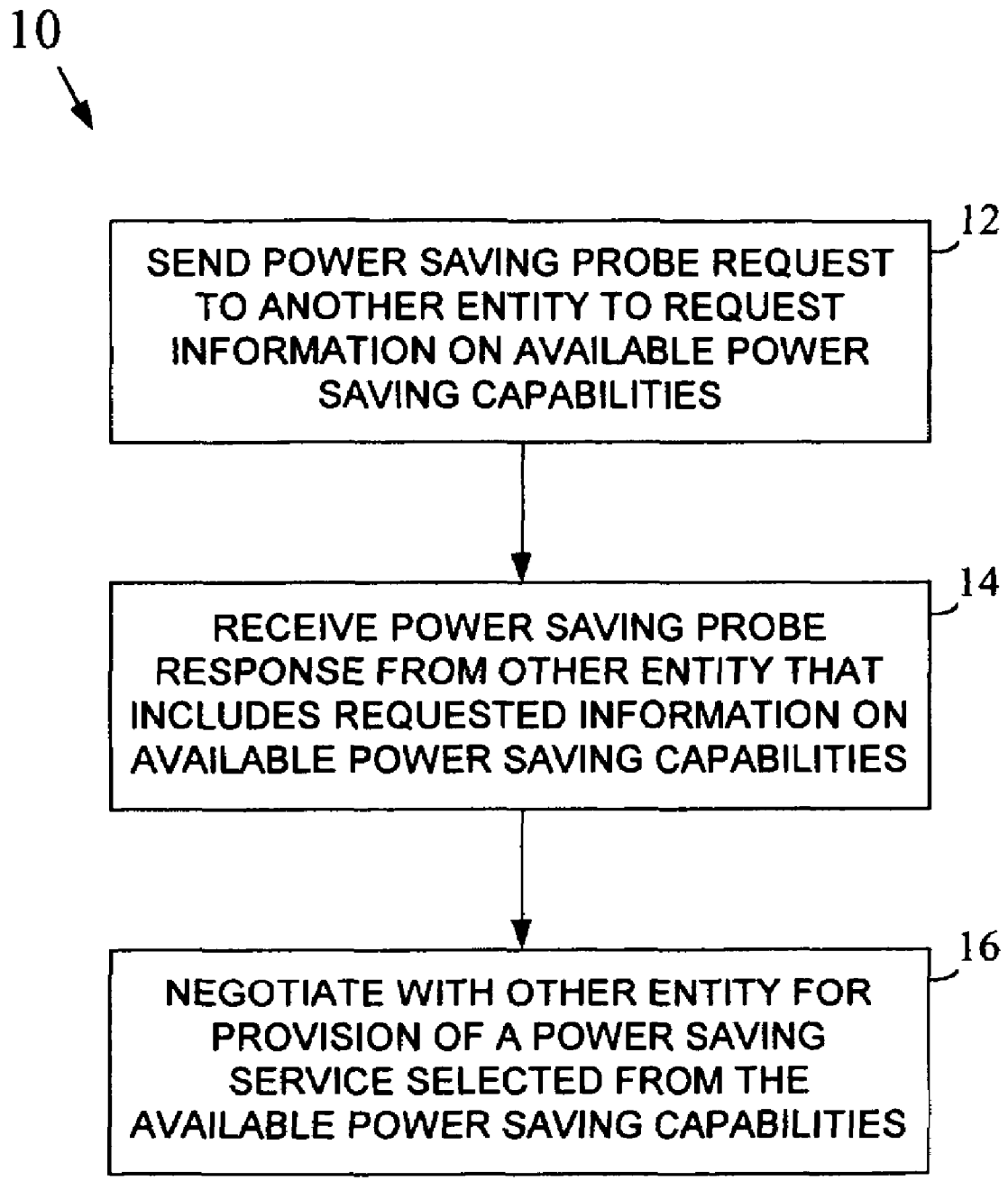
FIG. 1 is a flowchart illustrating an example power management method that may be implemented within a communication entity in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention relates to power management procedures and protocols that may be used within communication systems, networks, devices, and components. The inventive techniques may be used to reduce power consumption in communication devices having depletable energy sources, thereby extending the time between battery recharges or replacements. The techniques may be used within both wired and wireless systems.

FIG. 1 is a flowchart illustrating an example power management method 10 that may be implemented within a communication entity in accordance with an embodiment of the present invention. The communication entity can be any type of electronic component, device, or system that can communicate, via a medium, with another entity and that may require power management services from the other entity. For example, the method 10 may be performed by a mobile client device within a wireless communication network to establish power management policy between the device and a remote network access point or base station. Likewise, the method 10 may be implemented in a wired network or system to establish a power management arrangement between nodes in the network. In another possible scenario, the method 10 may be practiced within a smaller localized system (such as a laptop computer system) to establish a power management relationship between components within the system (e.g., between a CPU and a peripheral in a computer system). Other applications also exist.

As shown in FIG. 1, a power saving probe request is first sent from a first entity (i.e., the entity desiring power management) to a second entity to request information from the second entity that relates to the power saving capabilities thereof. The power saving capabilities of the second entity that are of concern to the first entity are those that can be used to provide power saving for the first entity as it interacts with the second entity. This may include, for example, different power saving functions or mechanisms that the second entity is capable of providing, as well as information on present conditions or resources associated with the second entity that impact power management capability. If the first entity is a wireless client device and the second entity is a wireless access point (AP), for example, the power saving capabilities may include capabilities, modes, protocols, procedures, etc. of the AP that can be used to reduce power consumption within the wireless client device as the wireless client device communicates with the AP. The capabilities may also include information such as the number of power saving systems that are currently within the network, the amount of buffer space that has been reserved for power saving buffering within the second entity, and other similar power management related information.

After the second entity receives the power saving probe request, it may respond by transmitting a power saving probe response message to the first entity that includes the requested information. The first entity receives the power saving probe response message from the second entity within a receiver thereof (block 14). The first entity may then initiate a negotiation with the second entity to establish a power saving policy between the two entities (block 16). The negotiation may be as simple as the first entity selecting the type of power saving services it would like the second entity to provide from the identified capabilities and then sending a power saving request to the second entity that requests these services. The second entity may then send a power saving response to the first entity that indicates that the service will, or will not, be provided. A more complex negotiation may alternatively be performed. For example, a number of messages may be delivered back and forth between the entities until a power saving strategy is decided upon. After a power saving policy has been established, the entities may communicate with one another in accordance with the negotiated policy.

Figure 2:
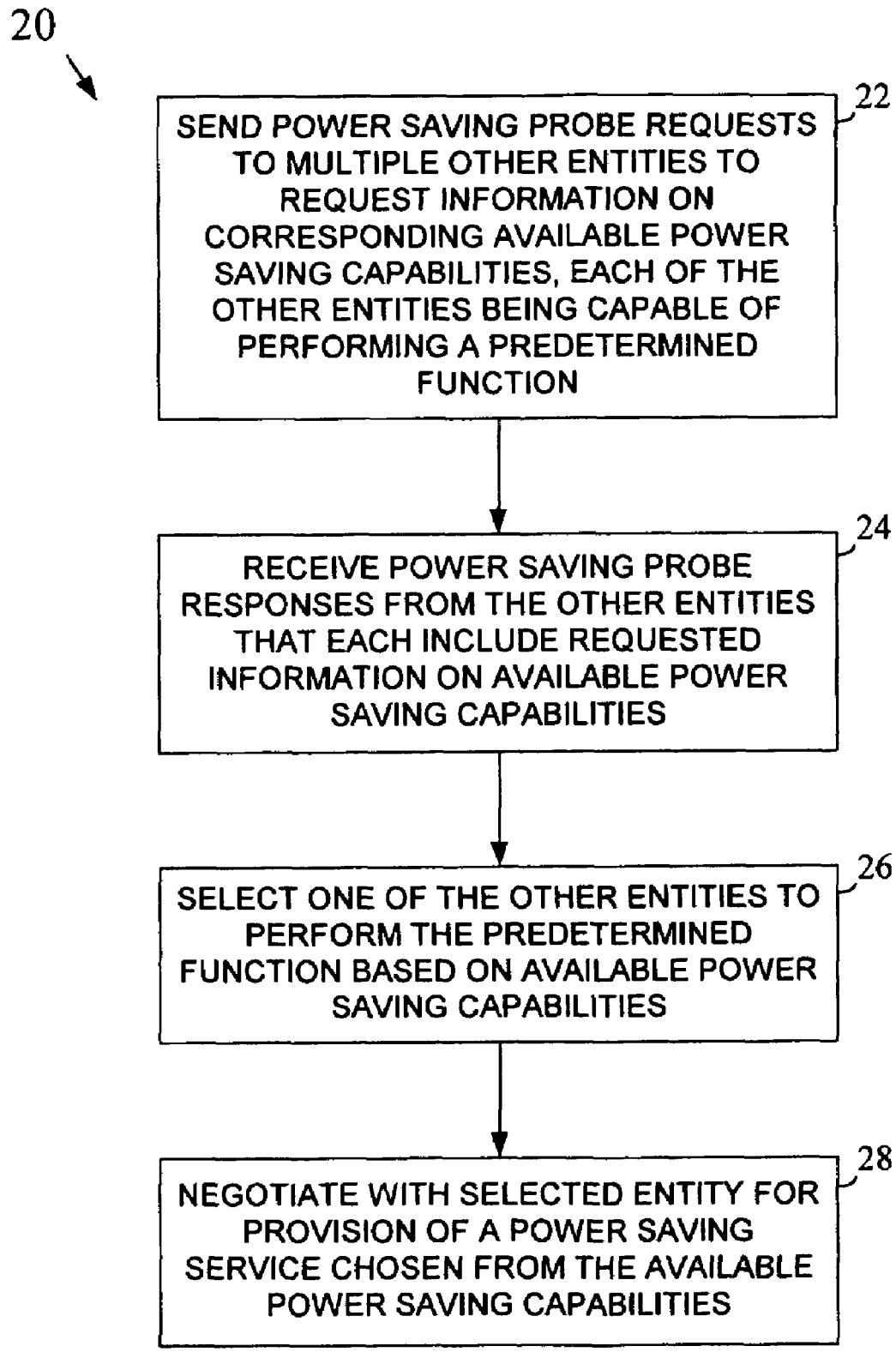
FIG. 2 is a flowchart illustrating another example power management method that may be implemented within a communication entity in accordance with an embodiment of the present invention.

FIG. 2 is a flowchart illustrating an example power management method 20 that may be implemented in a communication entity in accordance with an embodiment of the present invention. The method 20 is similar to the method 10 of FIG. 1, but it allows power saving capability information of multiple other entities to be used by a first entity to determine which of the other entities to communicate with. First, power saving probe requests are delivered from a first entity to multiple other entities (block 22). Each of the other entities may have been identified as an entity that is capable of performing a desired function for the first entity. For example, the first entity may wish to establish a connection to the Internet or some other network and it may identify multiple other entities through which this connection can be made. The first entity will then send power saving probe requests to the identified entities. The probe requests may be sent in any manner including, for example, as broadcast messages, as multicast messages, or as unicast messages. Some or all of the other entities may be wireless entities that are communicated with through corresponding wireless channels. Some or all of the other entities may also be wired entities that are communicated with through corresponding wired channels.

When each of the identified entities receives the power saving probe request, the entity may respond by transmitting a power saving probe response. The power saving probe responses of the other entities may then be received by the first entity (block 24). Based on the received power saving probe responses, the first entity may select the entity to perform the desired function (block 26). For example, if the first entity desires a high level of power saving, it may select an entity that includes more robust power saving capabilities. Factors other than power saving capabilities may also be considered by the first entity in selecting the other entity such as, for example, communication performance capabilities, cost factors, resource management considerations, and so on. After an entity has been selected to perform the desired function, the first entity may negotiate with the selected entity to develop a power saving policy between the entities as discussed previously (block 28).

Figure 3:
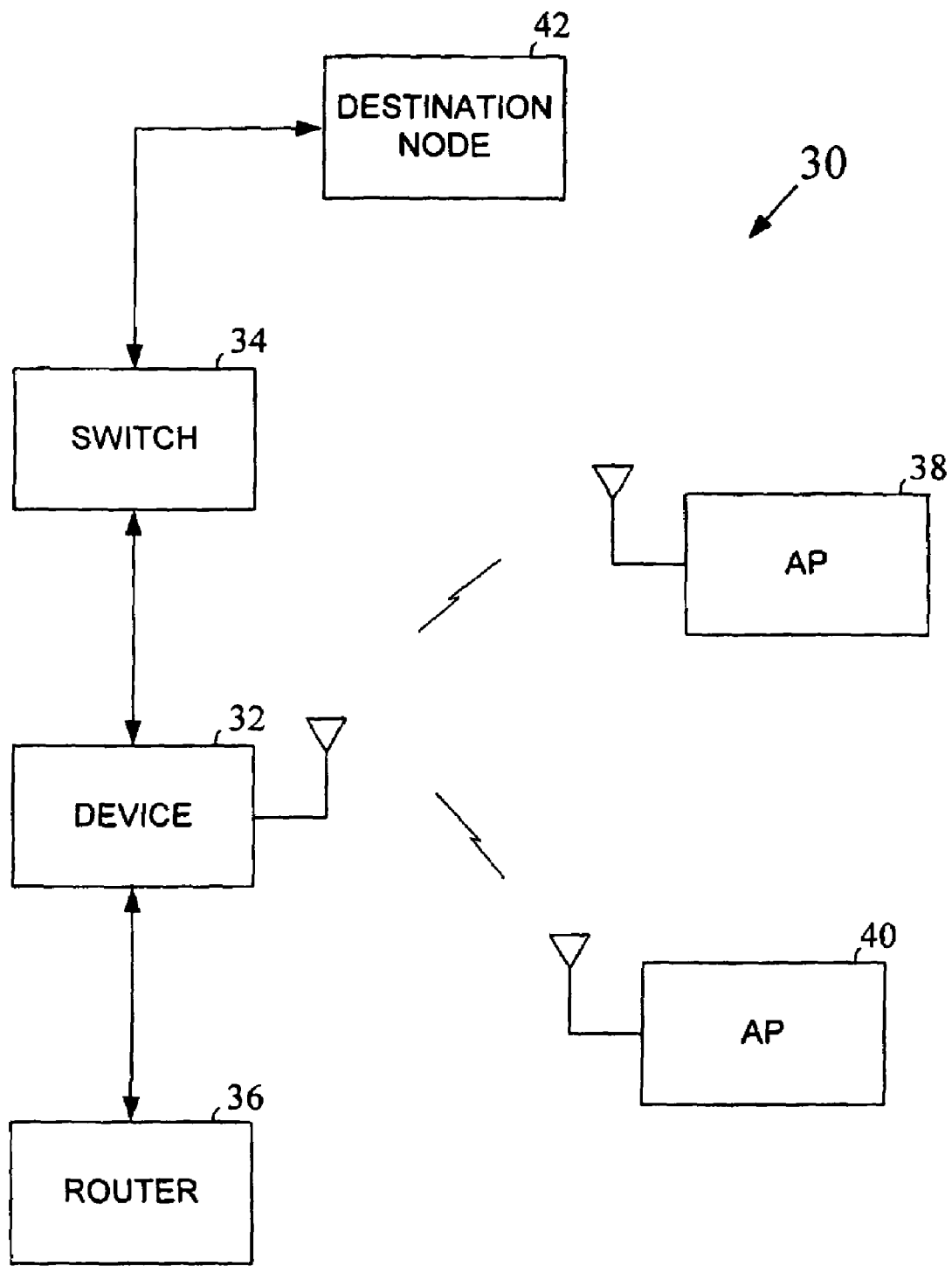
FIG. 3 is a block diagram illustrating an example network arrangement in which features of the present invention may be practiced.

FIG. 3 is a block diagram illustrating an example network arrangement 30 in which features of the present invention may be practiced. As shown, the network arrangement 30 includes a communication device 32 that may desire power management services during communication operations to preserve energy stored within the device. The communication device 32 may be connected to an Ethernet switch 34 through a wired medium. Likewise, the communication device 32 may be connected to a router 36 through the same or a different wired medium. The communication device 32 may also include wireless functionality that allows the device to communicate with one or more wireless APs 38, 40 (or other wireless communication devices) in a vicinity of the device 32. Any one or more wireless networking or wireless cellular standards may be supported. As used herein, the word "wireless" is intended to encompass all wireless transmission types included RF wireless, infrared (IR) and optical wireless, and others.

In one operational scenario, the communication device 32 may be associated with one of the APs 38,40 in the vicinity. When the device 32 first associates with the AP, the device 32 may send a power saving probe request to the AP. In response, the AP may send a power saving probe response to the communication device 32 that includes information on available power saving capabilities of the AP. The communication device 32 may then determine what type of power saving functions it would like to use while communicating with and through the associated AP, based on the available power saving capabilities. The communication device 32 may then negotiate with the associated AP for these desired functions. During negotiation, the associated AP may or may not agree to provide the requested functions. Eventually, the device 32 and the associated AP may arrive at a mutually acceptable power management policy.

The communication device 32 may follow a similar process with the switch 34 or the router 36 to develop a power management policy with either of these devices. The process may also be used to establish a power management policy between the communication device 32 and a device or structure that the communication device 32 is not in direct communication with. For example, the communication device 32 may send a power saving probe request to a destination node 42 within the network arrangement 30 through, for example, the switch 34 (or the router 36). The destination node 42 may then send a response that includes information on its power saving capabilities and a negotiation may take place.

The device 32 may also be configured to select a node within the network arrangement 30 to perform a predetermined function based on power saving capability information received from the nodes. For example, the device 32 may determine that a connection to the Internet needs to be established. The device 32 may know that the connection can be established through any one of: the switch 34, the router 36, the first AP 38, and the second AP 40. The device 32 may then send power saving probe requests to each of these entities, requesting power saving capability information. The device 32 may then receive power saving response messages from the entities that identify power saving capabilities thereof. The communication device 32 may then use the power saving capability information as part of a selection criterion to select an entity through which to establish the Internet connection. Any number of other factors may also be made part of the selection criterion. Although the illustrated communication device 32 includes both wired and wireless capabilities, it should be appreciated that some embodiments of the invention include communication entities that support only wireless or only wired connections. Many alternative network arrangements may be used.

Figure 4:
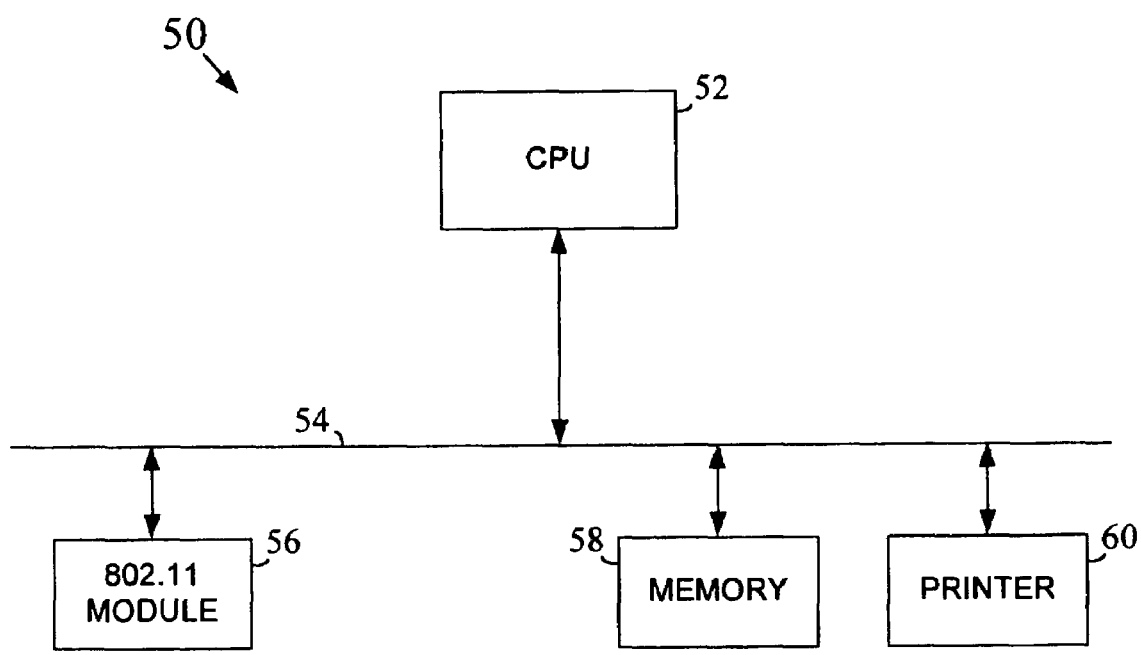
FIG. 4 is a block diagram illustrating an example computer system in which features of the present invention may be practiced.

FIG. 4 is a block diagram illustrating an example computer system 50 in which features of the present invention may be practiced. The computer system 50 may be, for example, a laptop computer or personal digital assistant (PDA) having a depletable energy source. As shown, a central processing unit (CPU) 52 is coupled to a bus 54 which allows the CPU 52 to communicate with various components, devices, and peripherals of the system. In the illustrated embodiment, for example, an IEEE 802.11 wireless networking module 56, a memory 58, and a printer 60 are coupled to the bus 54. Although illustrated with a single bus 54, it should be appreciated that one or more additional busses and/or other transmission structures may also be provided within the computer system 50 to interconnect components thereof.

The CPU 52 may desire to lower or minimize power consumption within the computer system 50 while communicating with other elements of the system. Therefore, when the CPU 52 desires to communicate with a particular element within the computer system 50, it may first send a power saving probe request to the element to determine the power saving capabilities of the element. For example, if the CPU 52 desires to communicate with the printer 60, it may first send a power saving probe request to the printer 60. The printer 60 may then respond by sending a power saving probe response to the CPU 52 identifying its power saving capabilities. The CPU 52 may then select a power saving function or functions from the available capabilities and then negotiate with the printer 60 for a power saving arrangement between the structures. In one approach, the CPU 52 may simply send a power saving request to the printer during the negotiation to indicate the selected power saving function(s) and the printer will then respond with either a yes or a no as to whether the function will be provided. Other more complex negotiations may alternatively be used. Although illustrated in the context of a computer system, it should be appreciated that features of the invention may be implemented within other localized systems to enhance power management within the systems as components thereof communicate with one another.

Figure 5:
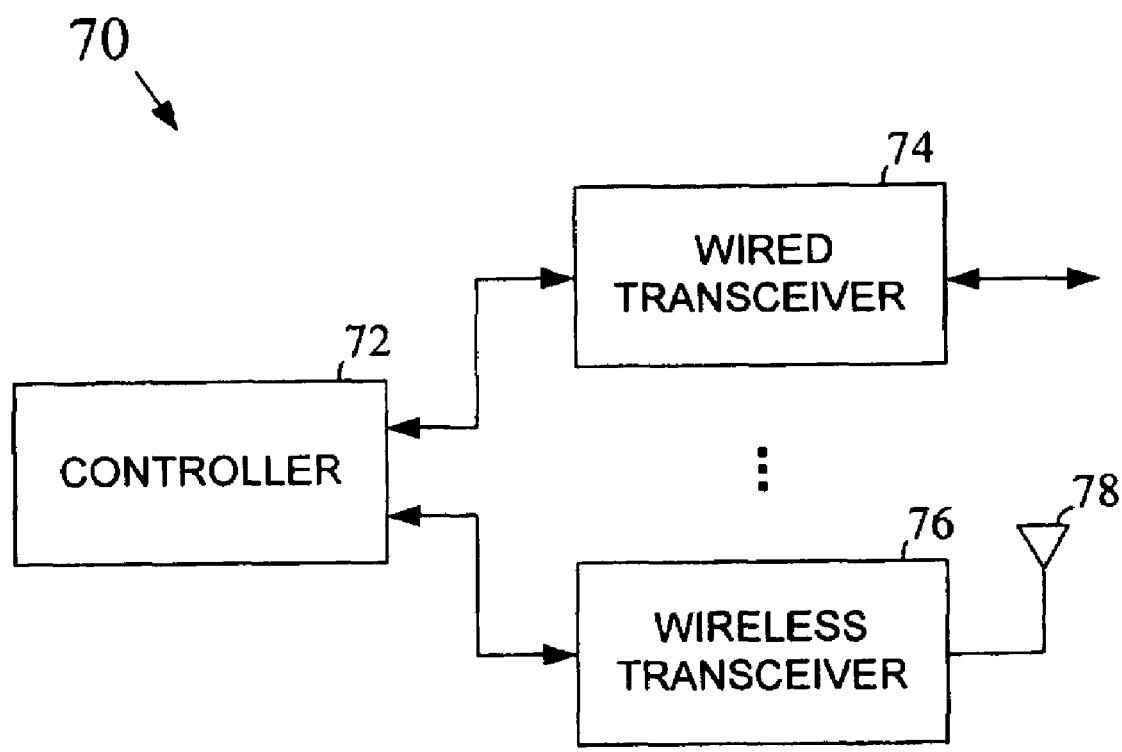
FIG. 5 is a block diagram illustrating an example architecture for a communication device in accordance with an embodiment of the present invention.

FIG. 5 is a block diagram illustrating an example architecture for a communication device 70 in accordance with an embodiment of the present invention. As illustrated, the communication device 70 includes one or more of: a controller 72, a wired transceiver 74, and a wireless transceiver 76. The wired transceiver 74 is for transmitting signals to and receiving signals from remote entities via a wired communication medium (e.g., an Ethernet bus, a universal serial bus (USB), IEEE 1394 bus, etc.). Likewise, the wireless transceiver 76 is for transmitting signals to and receiving signals from remote wireless entities via a wireless communication medium. One or more antennas 78 may be coupled to the wireless transceiver 76 to facilitate the transmission of signals into and the reception of signals from the wireless medium. Any type(s) of antenna may be used including, for example, a dipole, a patch, a helical antenna, an antenna array, and/or others. The wireless transceiver 76 may be configured in accordance with one or more wireless networking or cellular wireless standards or protocols. Additional wired or wireless transceivers may also be provided. In some embodiments, only wireless or only wired transceivers are used.

The controller 72 may be operative for, among other things, controlling the communication activity of the wired and wireless transceivers 74, 76. The controller 72 may also be operative to establish a power management policy between the communication device 70 and a remote communication entity to provide power savings for the device 70. The controller 72 may be configured to generate one or more power saving probe requests for delivery to one or more communication entities. Power saving probe requests that are directed to wireless entities may be delivered to the wireless transceiver 76 for transmission. Similarly, power saving probe requests that are directed to wired entities may be delivered to the wired transceiver 74 for transmission. Power saving probe responses may then be received via the corresponding transceivers.

The controller 72 may also be configured to negotiate with a remote wired or wireless entity for a power saving policy after the available power saving capabilities of the entity are known. The controller 72 may be implemented within one or more digital processing devices within the communication unit 70. The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. In at least one approach, the inventive principles are implemented as a power saving protocol within the communication device 70. In various embodiments, the controller 72 may be configured to implement the method 10 of FIG. 1 and/or the method 20 of FIG. 2.

Figure 6:
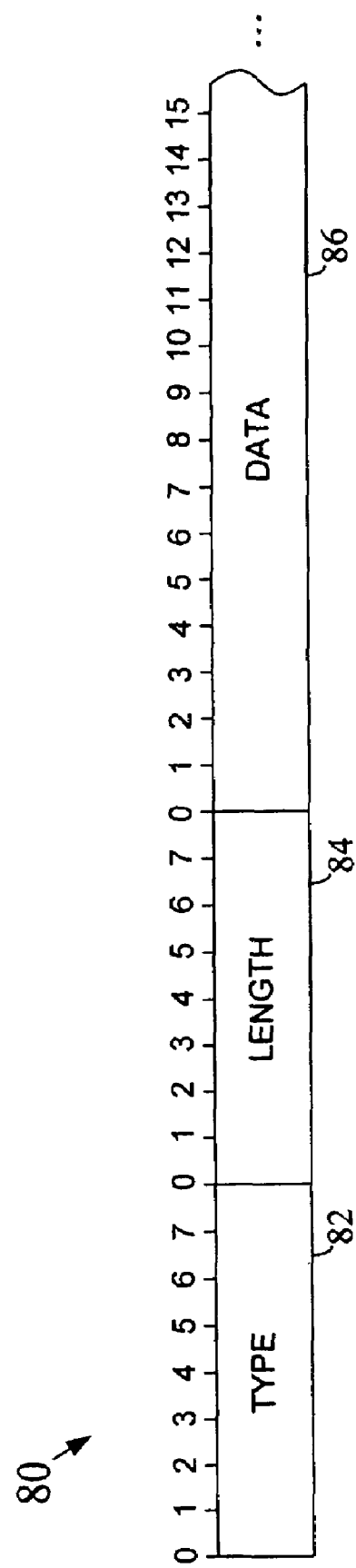
FIG. 6 is a diagram illustrating an example command structure for use in a TLV based power saving protocol in accordance with an embodiment of the present invention.

In at least one embodiment of the present invention, a power saving protocol is provided that incorporates various power saving techniques discussed herein. The power saving protocol may be programmed into a communication device (e.g., within a network interface card, as part of an operating system, etc.) for use in managing power consumption of the device. In at least one approach, the protocol makes use of the Tag-Length-Value (TLV) format for developing commands for the protocol. FIG. 6 is a diagram illustrating an example command 80 for use in a TLV based power saving protocol in accordance with an embodiment of the present invention. As shown, the command 80 includes a type (or tag) field 82, a length field 84, and a data field 86. The type field 82 includes information identifying the type of the command 80. The length field 84 identifies the length of the data field 86 within the command 80. The data field 86 includes the specifics about the command 80 including any sub-commands that may be part of the command 80. The type field 82 and the length field 84 are typically fixed length fields within a particular protocol. In the illustrated embodiment, for example, the type field 82 and the length field 84 are each 1 byte in length. All other commands within the same protocol will therefore have the same lengths for these two fields. The data field 86, on the other hand, may be 0 or more bits long in any particular command within the protocol. The format and length of the data field 86 for a particular command are dictated by the type and length fields 82, 84 of that command.

In at least one embodiment of the invention, a power saving protocol is provided that includes four command types; namely, (1) the power saving probe request, (2) the power saving probe response, (3) the power saving request, and (4) the power saving response. Table 1 illustrates the values that are used to identify these command types in the type field 82 in accordance with an embodiment of the present invention.

TABLE 1

COMMAND TYPES

| Name | Value |
|---|---|
| PS_PROBE_REQ | 0 |
| PS_PROBE_RSP | 1 |
| PS_REQ | 2 |
| PS_RSP | 3 |
| RESERVED | 4-255 |

Values of 4-255 within the type field 82 are reserved for other command types that may be defined in the future. Each of the command types may have one or more sub-commands that may be made part of a command. The sub-commands may be included within the data field 86 of the command and may also use the TLV format. Table 2 illustrates the sub-command types that may be included in a power saving probe request (PS_PROBE_REQ) in accordance with an embodiment of the present invention.

TABLE 2

SUB-COMMAND TYPES

| Name | Value |
| --- | --- |
| PS_Capabilities | 0 |
| PS_User_Matrix | 1 |
| PS_Avail_Buff_Size | 2 |
| Reserved | 3-255 |

The sub-command PS_Capabilites within a power saving probe request is used to determine the actual type(s) of power saving mechanisms that a network, system, device, or component is capable of providing (e.g., unscheduled automatic power save delivery (U-APSD), scheduled automatic power save delivery (S-APSD), wake-on-LAN (WoLAN), etc.). The PS_User_Matrix sub-command is used to determine a number of users in a network that are currently receiving power saving service and the level of power saving service being provided to those users. The PS_Avail_Buff_Size sub-command is used to determine the buffer size that is available for performing power saving functions in a system or network. The reserved values may be used to define sub-command types related to other power saving related information.

After a power saving probe request has been received by an entity associated with a network or system, the entity will send a power saving probe response. If the power saving probe request has requested power saving capability information, the response will include information on the capabilities of the network or system in a data field thereof. Table 3 illustrates the power saving capability types that may be included within a power saving probe response in accordance with an embodiment of the present invention. If no power saving capabilities are supported, a value of 0 may be used. Values of 11 through 30 are used to define capabilities related to IEEE 802.3 networks, values of 31-60 are used to define capabilities related to IEEE 802.11 networks, and values of 61-90 are used to define capabilities related to IEEE 802.16 networks. For example, a value of 11 indicates that no IEEE 802.3 power saving mechanism is supported. A value of 12 indicates that the wake-on-LAN mechanism is supported for an IEEE 802.3 network. A value of 13 indicates that the S-APSD mechanism is supported for an IEEE 802.3 network, and so on. Each of these network types have some values that are reserved for power saving capabilities defined in the future. In addition, values of 91-255 are reserved for use with power saving capabilities associated with other network types.

TABLE 3

POWER SAVING CAPABILITY TYPES

| Name | Value |
| --- | --- |
| PS_not_supported | 0 |
| Reserved_PS_General | 1-10 |
| PS_802_3_not_supported | 11 |
| PS_802_3_WoLAN | 12 |
| PS_802_3_S_APSD | 13 |
| PS_802_3_U_APSD | 14 |
| PS_802_3_Paging | 15 |
| PS_802_3_Comm_Self_Refresh | 16 |
| Reserved_PS_802_3 | 17-30 |
| PS_802_11_not_supported | 31 |
| PS_802_11_WoWLAN | 32 |
| PS_802_11_S_APSD | 33 |
| PS_802_11_U_APSD | 34 |
| PS_802_11_Paging | 35 |
| PS_802_11_Comm_Self_Refresh | 36 |
| Reserved_PS_802_11 | 37-60 |
| PS_802_16_not_supported | 61 |
| PS_802_16_WoWiMAX | 62 |
| PS_802_16_S_APSD | 63 |
| PS_802_16_U_APSD | 64 |
| PS_802_16_Paging | 65 |
| PS_802_16_Comm_Self_Refresh | 66 |
| Reserved_PS_802_16 | 67-90 |
| Reserved | 91-255 |

After the power saving probe response has been received by an entity, the entity may then develop a power saving request. The power saving request may include one or more sub-commands that each describe a power saving service that is being requested. These sub-commands may be placed within the data field 86 of the power saving request and may each use the TLV format. The requested services are selected from the available power saving capabilities identified within the corresponding power saving probe response. For example, an IEEE 802.11 enabled device may request that an AP provide two power saving services: Wake-On-Wireless-LAN and S-APSD. A power saving request requesting the above two services is set out below in a C programming language-like data structure:

```
Power_Saving_Command
{
    Type: 3 (PS_REQ)
    Length: 640 (bytes)
    Data:
    {
        Type: PS_802_11_WoWLAN
        Length: 320 (bytes)
        Data:
        {
            Wake_Filter_1:
                SRC_IP_ADDRESS: 10.0.0.1
                Port_Number: 80
            Wake_Filter_2:
                SRC_IP_ADDRESS: 20.0.0.1
                Port_Number: 911
        }
        Type: PS_802_11_S_APSD
        Length: 316
        Data: 802.11e_QOS_Info_Frame
        {
            Service Period: 10 ms
            Max Bandwidth: 5.5 Mbps
            ...
        }
    }
}
```

As shown in the above data structure, a power saving request type command is issued (Value 3) that has a data field that is 640 bytes in length. The data field has two sub-commands within it. A first sub-command requests an IEEE 802.11 Wake-On-WirelessLAN service and has a data field that is 320 bytes in length. The data field for the first sub-command identifies different occurrences that are to wake the corresponding device (e.g., a packet received at port 80 from IP address 10.0.0.1, etc.). A second sub-command requests an IEEE 802.11 S-APSD service and has a data field that is 316 bytes in length. The data field of this sub-command then lists various parameters to be used for the requested service. Any number of such sub-commands may be included within the data field of a power saving request message. The power saving response message that is received in response to the request may accept or reject the request. If the request is rejected, another power saving request may be transmitted that requests different or modified services.

The power management mechanisms in the current IEEE 802.11 a/b/g standards (directly) and the current IEEE 802.11 e/n standards (indirectly) depend on the traffic indicator map (TIM) and the delivery traffic indicator map (DTIM) information elements in the beacon frame transmitted by the AP to provide power management. A TIM element within a beacon indicates which client devices within a basic service set (BSS) currently have unicast traffic buffered within the wireless AP. A DTIM element within a beacon indicates which client devices within a service set currently have broadcast or multicast traffic buffered within the AP. The interval between beacons that include DTIMs is a multiple of the beacon interval (i.e., every Nth beacon includes a DTIM). Each beacon that does not include a DTIM includes a TIM. Beacons are sent by an AP at regular intervals based on an MIB variable "aBeaconPeriod." In the current standards, the variable "aBeaconPeriod" is set at 100 milliseconds (ms).

In the various IEEE 802.11 standards, the inclusion of the TIM and DTIM information within the regular beacon frames requires client devices in the power saving mode within a BSS to check the beacon frames for buffered-packet status at 100 ms intervals. As will be appreciated, this relatively large interval between beacons can reduce the effectiveness of the power saving activities within a BSS. In at least one aspect of the present invention, the power saving information that is typically placed within the regular beacon frames of an AP is instead placed within special power saving frames that are separate from the beacons. These power saving frames may then be transmitted from the AP at shorter intervals to provide more control over the power saving sleep patterns of a client device. In at least one embodiment, the frequency of the power saving frames is made adaptable based on factors such as, for example, the traffic load of the AP or some other criteria. To continue support for legacy devices, the power saving information may be included in both the regular beacon frames and the new power saving frames (although, in at least one embodiment, the information is only included within the new power saving beacons).

Figure 7:
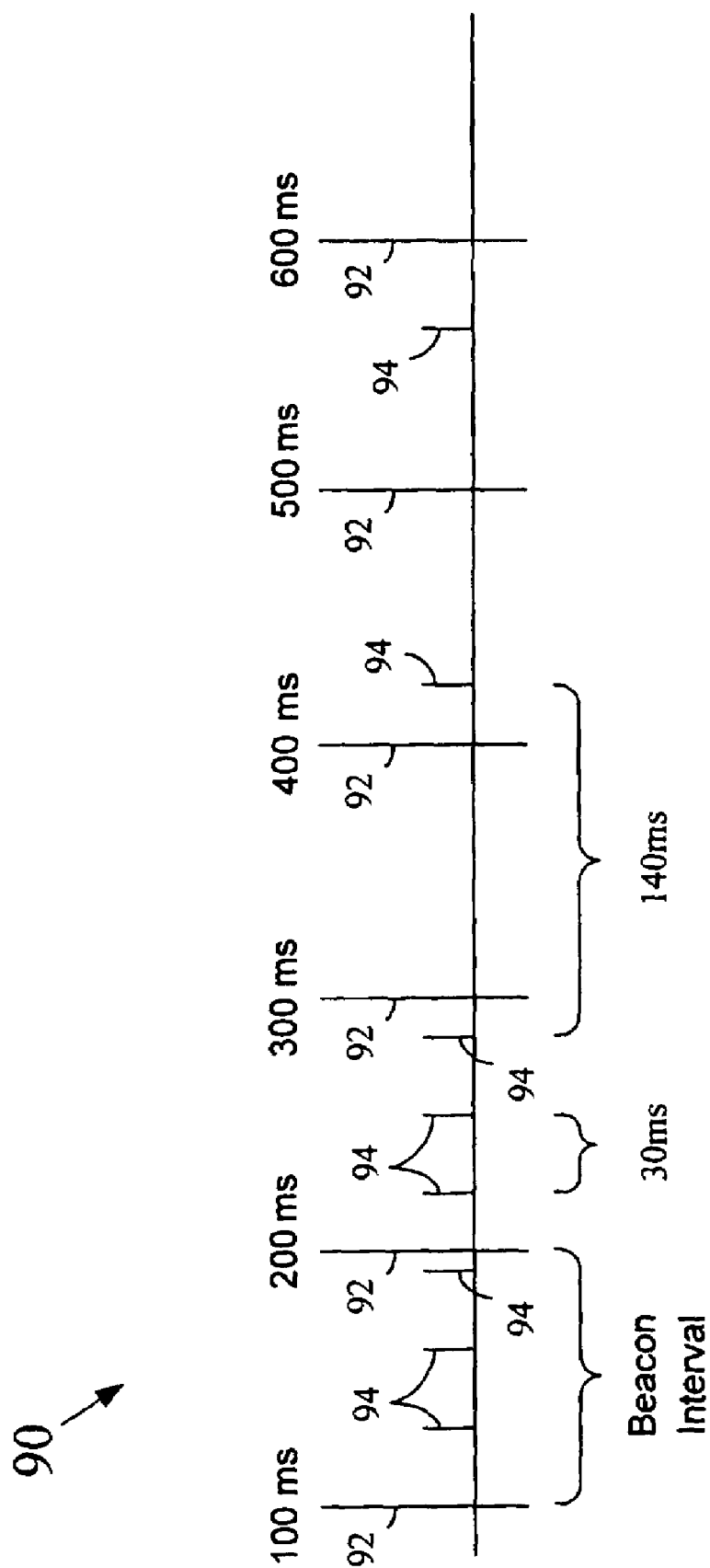
FIG. 7 is a timing diagram illustrating a signaling arrangement for use in a wireless network where separate power saving beacons are used in addition to conventional beacons in accordance with an embodiment of the present invention.

FIG. 7 is a timing diagram illustrating a signaling arrangement 90 for use in a wireless network where separate power saving beacons are used in addition to the regular beacons in accordance with an embodiment of the present invention. As shown, regular beacon signals 92 are transmitted by a wireless AP at regular 100 ms intervals. In addition, power saving beacons 94 are transmitted by the AP at other intervals for use in providing power saving related information to the client devices within the corresponding BSS. The power saving beacons 94 are used to carry the same or similar information to that typically included in the TIM and/or DTIM elements within the regular beacons 92 of legacy networks. Even when the new power saving beacons are being used, the power saving information may also remain in the regular beacons for use by legacy devices. By providing separate power saving beacons, a heightened level of power saving control may be achieved for a client device. In one possible approach, a constant inter-beacon interval is used for the power saving beacons that is lower than the inter-beacon interval for the regular beacons. This arrangement allows power saving information to be acquired by a client device more frequently than previously allowed, without requiring the client device to transmit anything (as is required by the U-APSD mechanism of IEEE 802.11e).

In another approach, the inter-beacon interval of the power saving beacons can be made adaptable based on one or more conditions in the network. For example, in one implementation, as illustrated in FIG. 7, the interval between power saving beacons may be toggled between a lower and a higher value based on, for example, current traffic levels in the AP. That is, for aggressive power saving (e.g., during low traffic conditions), an interval of 140 ms may be used to allow longer sleep intervals for user devices. For more performance based power saving (e.g., during higher traffic conditions), a smaller interval of 30 ms may be used. This, in effect, allows a balance to be achieved between power saving and performance in the network. Any number of different interval lengths may be used (i.e., two or more) in the adaptive arrangement.

As in legacy arrangements, some of the power saving beacons may contain unicast (TIM) related information and some may include broadcast and multicast (DTIM) related information. Alternatively, all power saving beacons may include unicast, broadcast, and multicast information. The interval between successive power saving beacons can be specified within the regular beacons or within the power saving beacons themselves. In one approach, each power saving beacon may indicate the interval between itself and the next power saving beacon to be transmitted. After the power saving client devices within a BSS determine the interval between successive power saving beacons, they will know when they need to wake up to read the corresponding power saving information. In an adaptive system, the inter-beacon interval information must be kept current within the power saving client devices so that power saving information is not missed.

In one aspect of the present invention, two power saving frame extensions are provided for the existing IEEE 802.11 standard. In one frame extension, a shorter version of the power saving beacon (compared to the larger regular beacon frame) is provided that allows a reduction in transmission time to be achieved. This, in turn, reduces the amount of energy consumed. In a second frame extension, a greater amount of power saving information is provided for a specific power saving client device. This extension utilizes the standard MAC frame to reuse the existing MAC frame parser and protocol compatibility in a standard IEEE 802.11 NIC. The extension may use a single power-saving frame exchange to give a client device better information for planning its sleeping pattern. Based on the number of packets buffered, the client device can determine how long the NIC can sleep and how long the platform can sleep.

A "broadcast" power saving beacon having the following structure may be transmitted by an AP in accordance with an embodiment of the present invention:

---

Broadcast_Power_Saving_Beacon
{
    TSF; //timestamp to assure AP and client are synchronized
    SSID;
    Power-Saving Beacon Interval; // const or adaptive rate
    TIM; // traffic indication map
}

---

As shown, the broadcast power saving beacon includes a time stamp that allows each client device to synchronize to the AP. The broadcast beacon also includes an SSID that identifies the service set that the beacon is associated with. The power saving beacon interval indicates the present interval between power saving beacons. If the interval value is adaptable, this parameter may change from beacon to beacon. The power saving beacon also includes a traffic indication map (TIM) that has the relevant power saving information for use by client devices in the service set. In some power saving beacons, a DTIM may be present instead of a TIM.

A "unicast" power saving beacon having the following structure may also be transmitted by an AP in accordance with an embodiment of the present invention:

```
Unicast_Power_Saving_Beacon (power-saving probe)
{
    Standard_802_11_MAC_Frame_Header;
    Power saving frame body
    {
        Buffer size; // total buffer size in bytes
        Packets; // total number of buffered packet
    }
    FCS; // 4 bytes checksum
}
```

As shown, the unicast power saving beacon may include a standard IEEE 802.11 medium access control (MAC) header to provide backward compatibility in the network for legacy devices. In the body of the unicast power saving beacon, the buffer size being used in the AP may be specified as well as the total number of buffered packets. The beacon may end with a 4 byte frame check sum (FCS). Other frame formats may alternatively be used.

The techniques and structures of the present invention may be implemented in any of a variety of different forms. For example, features of the invention may be embodied within cellular telephones and other handheld wireless communicators; personal digital assistants (PDAs); laptop, palmtop, desktop, and tablet computers; pagers; satellite communicators; cameras having communication capability; audio/video and multimedia devices having communication capability; network interface cards (NICs) and other network interface structures; integrated circuits; wireless access points and cellular base stations; Ethernet switches and routers; communication protocols; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu Ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
sending a power saving probe request from a first entity to a second entity to request information on available power saving capabilities of said second entity;
receiving a power saving probe response from said second entity that includes information on available power saving capabilities of said second entity; and
negotiating with said second entity for provision of at least one power saving service chosen from said available power saving capabilities.

2. The method of claim 1, wherein:
negotiating includes sending a power saving request from said first entity to said second entity to request a power saving service and receiving a power saving response from said second entity in response to said power saving request.

3. The method of claim 1, wherein:
said power saving probe request uses a Tag-Length-Value (TLV) format.

4. The method of claim 1, wherein:
said power saving probe request requests information on a quantity of power saving entities that are currently within a corresponding system.

5. The method of claim 1, wherein:
said power saving probe request requests information on an amount of buffer space that has been reserved for power saving buffering within said second entity.

6. A method comprising:
sending power saving probe requests from a first entity to multiple second entities to request information on available power saving capabilities of said multiple second entities, wherein each of said multiple second entities has been identified as being capable of performing a desired communication function for said first entity;
receiving power saving probe responses from said multiple second entities that each include information on available power saving capabilities of a corresponding second entity; and
selecting a second entity with which to communicate to perform said desired communication function for said first entity based on information within said received power saving probe responses.

7. The method of claim 6, wherein:
selecting a second entity includes selecting an entity based on a criterion that includes power saving capabilities as well as one or more additional factors.

8. The method of claim 6, further comprising:
negotiating with said selected second entity for provision of at least one power saving service chosen from the available power saving capabilities of said selected second entity.

9. The method of claim 6, wherein:
sending power saving probe requests to multiple second entities includes sending said power saving probe requests via one or more wireless media.

10. The method of claim 6, wherein:
sending power saving probe requests to multiple second entities includes sending said power saving probe requests via one or more wired media.

11. The method of claim 6, wherein:
sending power saving probe requests to multiple second entities includes sending at least one power saving probe request via a wireless medium and at least one power saving probe request via a wired medium.

12. An apparatus comprising:

at least one transceiver; and a controller that includes logic to generate a power saving probe request for transmission to a remote entity by said at least one transceiver, said power saving probe request to request information from said remote entity about power saving capabilities of said remote entity, said controller also including logic to receive a power saving probe response from said remote entity, in response to said power saving probe request, that includes information about power saving capabilities of said remote entity.

13. The apparatus of claim 12, wherein:

said controller includes logic to negotiate with said remote entity to establish a mutual power saving policy after said power saving probe response has been received.

14. The apparatus of claim 13, wherein:

said logic to negotiate with said remote entity includes logic to generate a power saving request for transmission to said remote entity by said transceiver, said power saving request identifying a power saving function selected from said power saving capabilities of said remote entity.

15. The apparatus of claim 12, wherein:

said controller includes logic to generate power saving probe requests for transmission to multiple remote entities within a common time frame, said power saving probe requests to each request information from a corresponding remote entity about power saving capabilities of said corresponding remote entity, wherein said controller also includes logic to select a remote entity to perform a predetermined function based on power saving probe responses received from said multiple remote entities in response to said power saving probe requests.

16. The apparatus of claim 12, wherein:

said at least one transceiver includes a wireless transceiver for transmitting signals into and receiving signals from a wireless medium.

17. The apparatus of claim 12, wherein:

said at least one transceiver includes a wired transceiver for transmitting signals into and receiving signals from a wired medium.

18. A system comprising:

at least one dipole antenna;

at least one transceiver, said at least one transceiver including a first transceiver that is coupled to said at least one dipole antenna; and a controller that includes logic to generate a power saving probe request for transmission to a remote entity by said at least one transceiver, said power saving probe request to request information from said remote entity about power saving capabilities of said remote entity, said controller also including logic to receive a power saving probe response from said remote entity, in response to said power saving probe request, that includes information about power saving capabilities of said remote entity.

19. The system of claim 18, wherein:

said controller includes logic to negotiate with said remote entity to establish a mutual power saving policy after said power saving probe response has been received.

20. The system of claim 19, wherein:

said logic to negotiate with said remote entity includes logic to generate a power saving request for transmission to said remote entity by said transceiver, said power saving request identifying a power saving function selected from said power saving capabilities of said remote entity.

21. An article comprising a storage medium having instructions stored thereon that, when executed by a computing platform, operate to:

send a power saving probe request from a first entity to a second entity to request information on available power saving capabilities of said second entity;

receive a power saving probe response from said second entity that includes information on available power saving capabilities of said second entity; and negotiate with said second entity for provision of at least one power saving service chosen from said available power saving capabilities.

22. The article of claim 21, wherein:

operation to negotiate includes operation to send a power saving request from said first entity to said second entity to request a power saving service and operation to receive a power saving response from said second entity in response to said power saving request.

23. The article of claim 21, wherein:

said power saving probe request uses a Tag-Length-Value (TLV) format.

* * * * *